US011838695B2

(12) United States Patent
Gao et al.

(10) Patent No.: US 11,838,695 B2
(45) Date of Patent: Dec. 5, 2023

(54) PROJECTION APPARATUS AND KEYSTONE CORRECTION METHOD

(71) Applicant: ALi Corporation, Hsinchu (TW)

(72) Inventors: Feng Gao, Guangdong (CN); Can Ping Zheng, Guangdong (CN); Shan Jian Liu, Guangdong (CN); Lun Liang, Guangdong (CN)

(73) Assignee: ALi Corporation, Hsinchu (TW)

( * ) Notice: Subject to any disclaimer, the term of this patent is extended or adjusted under 35 U.S.C. 154(b) by 97 days.

(21) Appl. No.: 17/582,021

(22) Filed: Jan. 24, 2022

(65) Prior Publication Data
US 2022/0247983 A1 Aug. 4, 2022

(30) Foreign Application Priority Data
Feb. 1, 2021 (CN) .......................... 202110136044.7

(51) Int. Cl.
*H04N 9/31* (2006.01)
*G06T 3/60* (2006.01)
(Continued)

(52) U.S. Cl.
CPC .............. *H04N 9/3185* (2013.01); *G06T 1/20* (2013.01); *G06T 1/60* (2013.01); *G06T 3/4007* (2013.01);
(Continued)

(58) Field of Classification Search
CPC ...... H04N 9/3185; H04N 9/3188; G06T 1/20; G06T 1/60; G06T 3/4007; G06T 3/60; G06T 7/60; G06T 9/00; G06T 11/00; G06T 2200/28; G06T 2207/10016; G06T 2207/20068
See application file for complete search history.

(56) References Cited

U.S. PATENT DOCUMENTS 6,367,933 B1 * 4/2002 Chen .................... H04N 3/2335
353/69
7,126,616 B2 * 10/2006 Jasa ........................ G06T 5/006
345/646

(Continued)

FOREIGN PATENT DOCUMENTS

CN 1210944 7/2005

*Primary Examiner* — Brian P Yenke
(74) *Attorney, Agent, or Firm* — JCIPRNET

(57) ABSTRACT

A projection apparatus and a keystone correction method thereof are provided. The projection apparatus includes a display processing circuit including an image processing circuit, a first keystone correction circuit, a rotation circuit, a second keystone correction circuit, and a video output circuit. The first keystone correction circuit performs first keystone correction processing on a processed image frame based on horizontal scaling processing to obtain a first corrected image frame. The rotation circuit performs rotation processing on the first corrected image frame to write a rotated image frame into a memory. The second keystone correction circuit reads the rotated image frame from the memory and performs second keystone correction processing on the rotated image frame based on the horizontal scaling processing to obtain a second corrected image frame. The video output circuit transmits the second corrected image frame to a projection module through a data transmission interface.

10 Claims, 5 Drawing Sheets

(51) Int. Cl.
  *G06T 3/40*  (2006.01)
  *G06T 7/60*  (2017.01)
  *G06T 9/00*  (2006.01)
  *G06T 1/20*  (2006.01)
  *G06T 11/00* (2006.01)
  *G06T 1/60*  (2006.01)

(52) U.S. Cl.
  CPC .................. *G06T 3/60* (2013.01); *G06T 7/60* (2013.01); *G06T 9/00* (2013.01); *G06T 11/00* (2013.01); *H04N 9/3188* (2013.01); *G06T 2200/28* (2013.01); *G06T 2207/10016* (2013.01); *G06T 2207/20068* (2013.01)

(56) References Cited

U.S. PATENT DOCUMENTS

| | | | | |
|---|---|---|---|---|
| 7,352,913 B2* | 4/2008 | Karuta | ................. | H04N 9/3194 348/746 |
| 7,441,906 B1* | 10/2008 | Wang | ..................... | G03B 21/14 353/121 |
| 7,705,862 B1* | 4/2010 | Teng | ..................... | G09G 3/002 345/647 |
| 8,300,978 B2* | 10/2012 | Tamura | ................. | G03B 21/14 348/744 |
| 8,396,322 B1* | 3/2013 | Woodall | ............... | H04N 9/3152 382/277 |
| 8,482,573 B2* | 7/2013 | Mallett | ................. | G06T 3/0093 345/531 |
| 8,529,069 B2* | 9/2013 | Oka | ..................... | H04N 9/3194 353/30 |
| 8,888,296 B2* | 11/2014 | Ota | ........................ | G09G 3/002 345/506 |
| 9,270,900 B2* | 2/2016 | Kitashou | ........... | H04N 9/3185 |
| 9,524,578 B2* | 12/2016 | Fuchikami | .......... | H04N 9/3182 |
| 9,915,857 B2* | 3/2018 | Bassi | .................. | H04N 9/3194 |
| 10,057,555 B2* | 8/2018 | Saigo | .................. | H04N 9/3185 |
| 10,339,718 B1* | 7/2019 | Kamal | ................. | H04N 9/3194 |
| 10,616,542 B2* | 4/2020 | Wang | .................. | H04N 9/3182 |
| 10,853,911 B2* | 12/2020 | Leong | ................. | G06V 40/103 |
| 10,884,546 B2* | 1/2021 | Vinas | .................. | H04N 9/3185 |
| 10,901,309 B2* | 1/2021 | Bassi | ....................... | G06T 3/60 |
| 11,258,997 B2* | 2/2022 | De La Cruz | ......... | H04N 9/3194 |
| 11,350,066 B1* | 5/2022 | De La Cruz Vazquez | .................. | G06T 5/006 |
| 11,652,967 B2* | 5/2023 | Liang | .................... | G06T 3/0056 353/69 |
| 2005/0041216 A1* | 2/2005 | Kobayashi | ........... | H04N 9/3194 353/69 |
| 2005/0180655 A1* | 8/2005 | Ohta | ..................... | G06T 3/4007 382/300 |
| 2006/0280376 A1* | 12/2006 | Lei | ....................... | H04N 3/2335 348/E3.045 |
| 2007/0291051 A1* | 12/2007 | Brown | ............... | G02B 26/0816 345/32 |
| 2009/0238490 A1* | 9/2009 | Tamura | .................. | G09G 3/002 353/70 |
| 2011/0285971 A1* | 11/2011 | Oka | ...................... | H04N 9/3185 353/70 |
| 2012/0200588 A1* | 8/2012 | Posa | .................... | H04N 9/3185 345/589 |
| 2012/0223972 A1* | 9/2012 | Hsu | ...................... | H04N 9/3185 345/659 |
| 2013/0222386 A1* | 8/2013 | Tannhauser | .......... | H04N 9/3185 345/428 |
| 2013/0314594 A1* | 11/2013 | Kim | ..................... | H04N 7/0112 348/441 |
| 2014/0085192 A1* | 3/2014 | Posa | ...................... | G09G 3/001 345/156 |
| 2015/0084992 A1* | 3/2015 | Wada | ........................ | G06T 7/80 345/682 |
| 2015/0187057 A1* | 7/2015 | Kobayashi | ........... | H04N 9/3185 345/647 |
| 2016/0260202 A1* | 9/2016 | Saigo | .................. | H04N 5/2628 |
| 2017/0150110 A1* | 5/2017 | Nevo | ....................... | G06T 7/60 |
| 2018/0139423 A1* | 5/2018 | Moule | .................. | H04N 9/3182 |
| 2019/0149788 A1* | 5/2019 | Liou | .................. | G01B 11/2504 348/189 |
| 2022/0141434 A1* | 5/2022 | Qu | ............................ | G06T 7/60 348/745 |
| 2022/0141435 A1* | 5/2022 | Zhang | ....................... | G06T 7/13 348/745 |
| 2022/0292652 A1* | 9/2022 | Takeuchi | ................... | G06T 5/50 |
| 2023/0102878 A1* | 3/2023 | Wang | .................. | G01S 7/4915 348/744 |

* cited by examiner

PROJECTION APPARATUS AND KEYSTONE CORRECTION METHOD

CROSS-REFERENCE TO RELATED APPLICATION

This application claims the priority benefit of China patent application serial no. 202110136044.7, filed on Feb. 1, 2021. The entirety of the above-mentioned patent application is hereby incorporated by reference herein and made a part of this specification.

BACKGROUND

Technical Field

The disclosure relates to a projection technique, and particularly relates to a projection apparatus and a keystone correction method thereof.

Description of Related Art

Along with advancement of technology, various projection apparatuses have been widely used in various occasions, such as presentations, speeches, theaters, audio-visual teaching, interactive teaching, home theater sets, etc. A projection apparatus is a display apparatus used for generating projection images. An imaging principle of the projection apparatus is to convert an illumination light beam generated by an illumination system into an image light beam through an imaging device and then project the image light beam onto a projection surface or a wall through a projection lens to form a projection image.

It should be noted that when a lens optical axis of the projection apparatus is not perpendicular to the projection surface or the wall, the projection image on the projection surface or the wall may show keystone distortion, which causes reduction in projection quality. Namely, the projection apparatus must be placed in a way that the lens optical axis thereof is perpendicular to the projection surface, so that the projection image will not be distorted. A user may manually adjust a placement position and a placement manner of the projection apparatus, but the user may probably be unable to adjust the projection image to an ideal state due to environmental restrictions. In order to solve the above problem, before the projection apparatus performs projection, an image processing chip inside the projection apparatus may be used to perform image pre-distortion processing to achieve keystone correction. At present, the keystone correction may be implemented by a graphics processing unit (GPU) according to the transmission technology. However, based on the conversion principle of a transmission formula, when the GPU accesses a memory, data access discontinuity occurs, which results in poor access efficiency of the GPU to the memory and wastes of memory access bandwidth. Therefore, how to achieve highly efficient keystone correction exhibiting a good correction effect is an important issue.

SUMMARY

The disclosure is directed to a projection apparatus and a keystone correction method thereof capable of achieving highly efficient and low-cost keystone correction, and improved projection quality is thus provided.

An embodiment of the disclosure provides a projection apparatus including a projection module, a memory, and a display processing circuit. The display processing circuit is coupled to the projection module, is coupled to the memory through a memory bus, and includes an image processing circuit, a first keystone correction circuit, a rotation circuit, a second keystone correction circuit, and a video output circuit. The image processing circuit generates a processed image frame. The first keystone correction circuit performs first keystone correction processing on the processed image frame based on horizontal scaling processing to obtain a first corrected image frame. The rotation circuit performs rotation processing on the first corrected image frame to write a rotated image frame into the memory. The second keystone correction circuit reads the rotated image frame from the memory and performs second keystone correction processing on the rotated image frame based on the horizontal scaling processing to obtain a second corrected image frame. The video output circuit transmits the second corrected image frame to the projection module through a data transmission interface.

An embodiment of the disclosure provides a keystone correction method adapted to a projection apparatus including a projection module, a memory, and a display processing circuit. The keystone correction method includes the following steps. A processed image frame is generated by the display processing circuit. First keystone correction processing is performed on the processed image frame by the display processing circuit based on horizontal scaling processing to obtain a first corrected image frame. Rotation processing is performed on the first corrected image frame by the display processing circuit to write a rotated image frame into the memory. The rotated image frame is read from the memory by the display processing circuit, and second keystone correction processing is performed on the rotated image frame based on the horizontal scaling processing to obtain a second corrected image frame. The second corrected image frame is transmitted to the projection module by the display processing circuit through a data transmission interface.

Based on the above description, in the embodiments of the disclosure, the display processing circuit first performs the first vertical keystone correction processing and then performs the rotation processing for writing back to the memory. Then, the display processing circuit reads the rotated image frame from the memory and performs the second vertical keystone correction processing. After the vertical keystone correction processing which is performed twice and the rotation processing which is performed once, the display processing circuit may implement the keystone correction function of the projection apparatus. In this way, the keystone correction function of the projection apparatus may be completed simply through horizontal line scanning, and a demanding capacity of memory space is thereby saved. In addition, the display processing circuit exhibits high access efficiency for accessing the memory, and an access bandwidth of the memory is not wasted. In thus can be seen that, the keystone correction function may be implemented through highly efficient and low-cost image scaling processing, and the quality of the projection image is therefore improved.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated

DESCRIPTION OF THE EMBODIMENTS

Figure 1A:
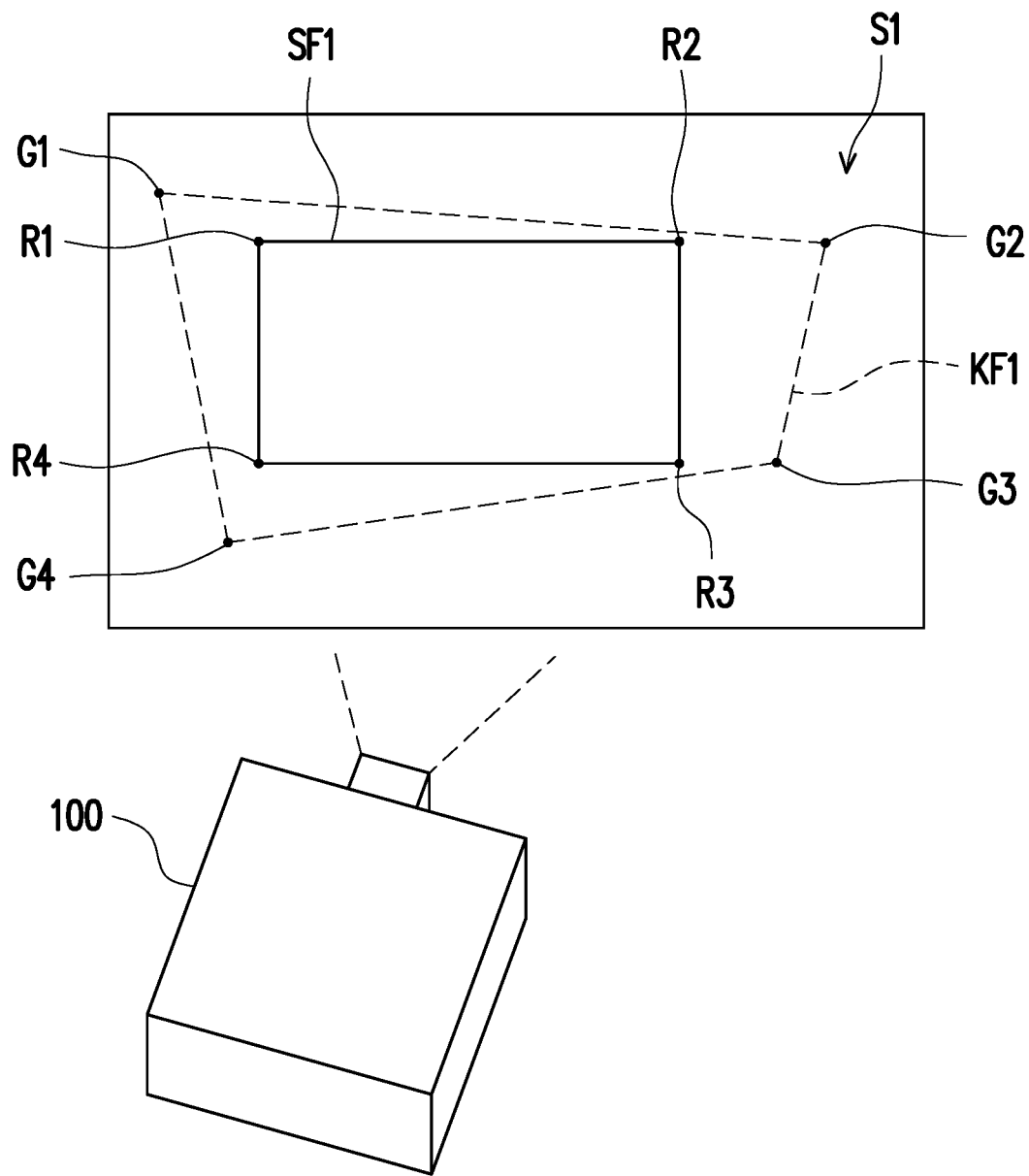
FIG. 1A is a schematic view illustrating projection performed by a projection apparatus according to an embodiment of the disclosure.

Reference will now be made in detail to the present preferred embodiments of the disclosure, examples of which are illustrated in the accompanying drawings. Wherever possible, the same reference numbers are used in the drawings and the description to refer to the same or like parts.

Figure 1B:
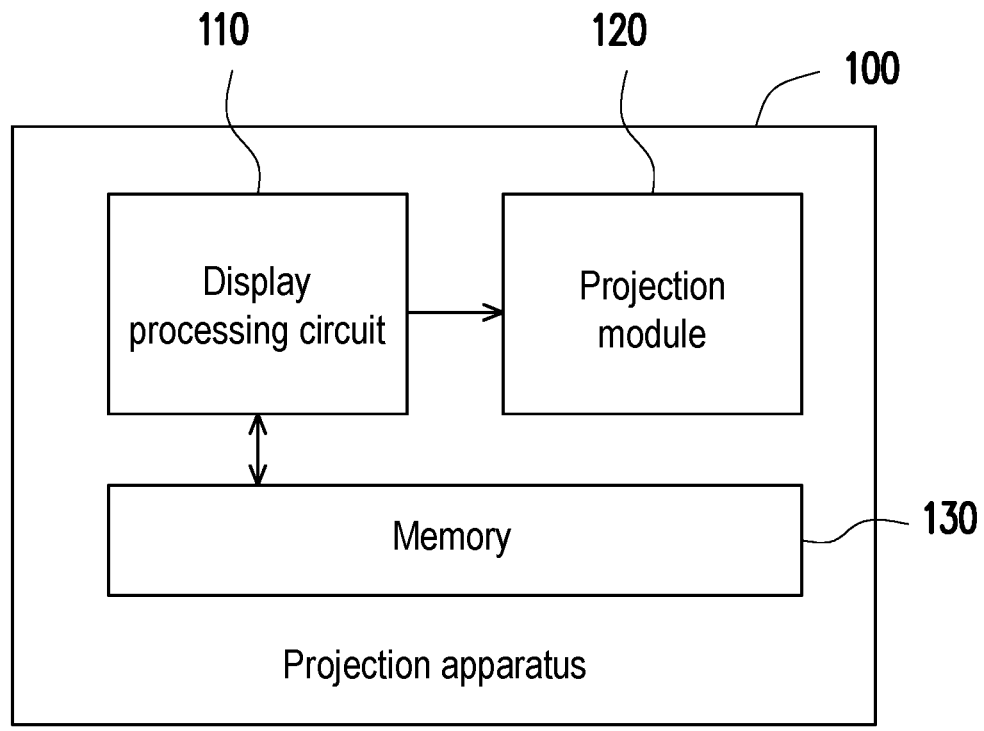
FIG. 1B is a schematic view of the projection apparatus according to an embodiment of the disclosure.

FIG. 1A is a schematic view of projection performed by a projection apparatus according to an embodiment of the disclosure. FIG. 1B is a schematic view of the projection apparatus according to an embodiment of the disclosure. Referring to FIG. 1A and FIG. 1B, a projection apparatus 100 may project an image on a projection surface S1 and may be a liquid crystal projector (LCP), a digital light processing (DLP) projector, or a liquid crystal on silicon (LCOS) projection display apparatus, etc. In this embodiment, the projection apparatus 100 may include a display processing circuit 110, a projection module 120, and a memory 130. The projection module 120 may include a light source module, an optical engine module, a lens module, and related optical and circuit control assemblies, etc. The display processing circuit 110 is coupled to the projection module 120, is coupled to the memory 130 through a memory bus, and has an image processing function and a keystone correction function. The image processing function is, for example, image scaling processing, image denoising processing, image enhancement processing, image tone processing, image overlay processing, etc. The keystone correction function is to be described in detail in subsequent embodiments. The memory 130 is, for example, a DRAM and may be connected to a plurality of circuit modules of the projection apparatus 100 through the memory bus, so that these circuit modules may record data in the memory 130 or read required data from the memory 130. In detail, the display processing circuit 110 may obtain image data to be projected from the memory 130, performs image processing and keystone correction processing on the image data to generate a corrected image frame, and then provides the corrected image frame to the projection module 120 for projection.

It is known that if the projection apparatus 100 does not perform any keystone correction processing, and a lens optical axis of the projection apparatus 100 is not perpendicular to the projection surface S1, a keystone distortion image KF1 on the projection surface S1 may show projection image distortion and content distortion. Therefore, in the embodiments of the disclosure, in order to implement the keystone correction function, the display processing circuit 110 may perform image deformation processing, so that the projection apparatus 100 may display a rectangular projection image SF1 with undistorted content on the projection surface S1. In some embodiments, the display processing circuit 110 implements the keystone correction processing by performing horizontal scaling processing. To be specific, the display processing circuit 110 performs the image scaling processing based on coordinate information of positioning points R1-R4. Therefore, when the projection module 120 projects the image generated by the image scaling processing, the rectangular projection image SF1 may be displayed in a rectangular area defined by the positioning points R1-R4 on the projection surface S1.

In some embodiments, the positioning points R1-R4 on the projection surface S1 may be calibrated by a user. More specifically, the projection apparatus 100 may perform projection without performing keystone correction processing, and then the user may use an input device (such as a remote controller or buttons on the projection apparatus 100) to calibrate the positioning points R1-R4 within an image range of the keystone distortion image KF1. Alternatively, in some embodiments, the positioning points R1-R4 on the projection surface S1 may be determined based on sensing data of a distance sensor or an image sensor of the projection apparatus 100. Based on the positioning points R1-R4 on the projection surface S1, the projection apparatus 100 may obtain a target quadrilateral boundary required for keystone correction processing according to a transmission transformation relationship, and perform the image scaling processing based on the target quadrilateral boundary.

In some embodiments, when the projection apparatus 100 projects a rectangular test image without the keystone correction processing, a non-rectangular keystone distortion image KF1 is displayed on the projection surface S1. Thus, the image processing circuit 110 may obtain coordinates of four vertices G1-G4 of the projection image KF1 on the projection surface S1, for example, to generate the coordinates through photographing of an image sensor. Then, a corresponding transmission transformation matrix may be calculated according to the coordinates of the four vertices G1-G4. In this way, after the positioning points R1-R4 on the projection surface S1 are obtained, a non-rectangular quadrilateral boundary formed by the four target vertices in the projection image coordinate system may be deduced according to the aforementioned transmission transformation matrix and the coordinates of the positioning points R1-R4. In this way, by shrinking the rectangular image frame to fit a target deformation range, the projection apparatus 100 may subsequently project the rectangular projection image SF1 without content distortion.

Figure 2:
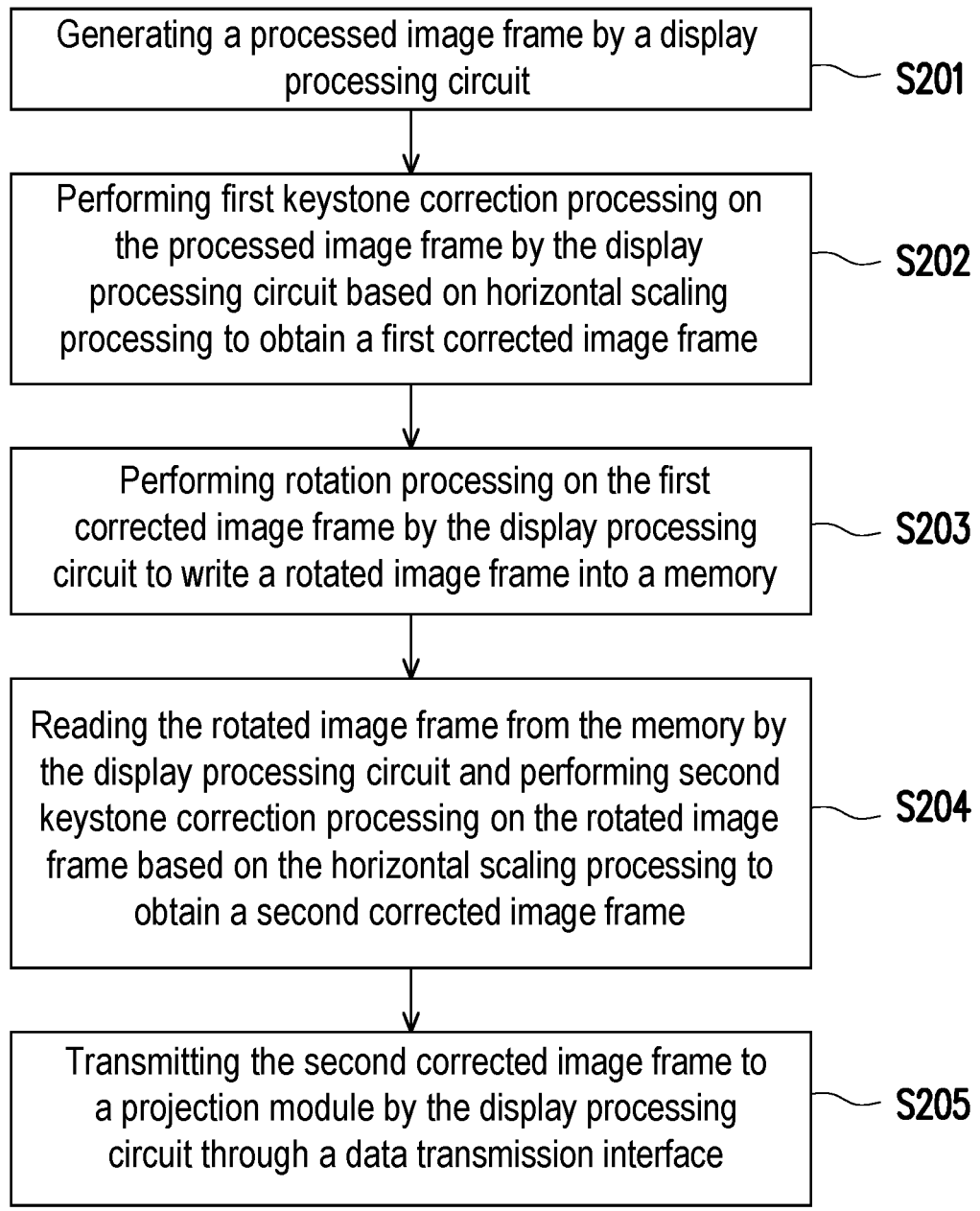
FIG. 2 is a flow chart illustrating a keystone correction method according to an embodiment of the disclosure.

Referring to FIG. 2, FIG. 2 is a flow chart illustrating a keystone correction method according to an embodiment of the disclosure, and the method shown in FIG. 2 may be implemented by the projection apparatus 100 of FIG. 1B.

First, in step S201, the display processing circuit 110 generates a processed image frame. In detail, the display processing circuit 110 may obtain the image data to be projected from the memory 130 and perform image processing on the image data to obtain the processed image frame. The image processing is, for example, image scaling processing, image denoising processing, image enhancement processing, image tone processing or image overlay processing, etc. It should be noted that in different embodiments, the display processing circuit 110 may obtain image frame data subjected to or not subjected to rotation processing from the memory 130.

In some embodiments, the processed image frame may include a video image frame generated based on video decoding, graphics data generated by a graphics processing unit (GPU), or a combination thereof.

In step S202, the display processing circuit 110 performs first keystone correction processing on the processed image frame based on horizontal scaling processing to obtain a first corrected image frame. In detail, by performing the horizontal scaling processing along a horizontal direction, the display processing circuit 110 may perform vertical keystone correction processing on the processed image frame with image content subjected to or not subjected to the rotation processing, so as to convert the processed image frame into a first trapezoidal image block. The first corrected image frame may include the aforementioned first trapezoidal image block and a background block on both sides of the first trapezoidal image block. In an embodiment, the aforementioned background block may be a black block or other background color block. The horizontal scaling processing is processing of converting one or more rows of input pixels into one row of output pixels according to a reduction magnification, where one row of input pixels has N pixels and one row of output pixels has M pixels, and N≥M.

In step S203, the display processing circuit 110 performs rotation processing on the first corrected image frame to write a rotated image frame into the memory 130. To be specific, the display processing circuit 110 may write the pixels of the first corrected image frame back to the memory 130 through the memory bus according to a certain order and storage location, so as to perform the rotation processing or mirroring processing on the first corrected image frame. For example, the display processing circuit 110 may write one row of pixels of the first corrected image into a storage location corresponding to one column of pixels to complete a 90-degree rotation processing on the first corrected image frame, and write the rotated image frame back to the memory 130. Alternatively, in some embodiments, a line buffer may be set in the display processing circuit 110, and one row of pixels of the first corrected image may be written into the line buffer according to a certain order and storage location, so as to perform the rotation processing or mirroring processing on the first corrected image frame.

In step S204, the display processing circuit 110 reads the rotated image frame from the memory 130 and performs second keystone correction processing on the rotated image frame based on the horizontal scaling processing to obtain a second corrected image frame. The display processing circuit 110 reads the rotated image frame from the memory 130 through the memory bus, and performs the horizontal scaling processing on the rotated image frame along the horizontal direction, so as to convert the rotated image frame into a second trapezoidal image block. The second corrected image frame may include the aforementioned second trapezoidal image block and a background block on both sides of the second trapezoidal image block. In an embodiment, the aforementioned background block may be a black block or other background color block. In this way, the first trapezoidal image block with projection content generated in step S202 may be further converted into a non-rectangular image block with projection content and aligned with the target deformation range.

It should be noted that regardless of whether the rotated image frame is written to the memory 130 or the rotated image frame is read from the memory 130, the pixel data transmitted through the memory bus based on a memory read request or a memory write request is necessary, so that the access bandwidth of the memory 130 is not wasted.

In step S205, the display processing circuit 110 transmits the second corrected image frame to the projection module 120 through a data transmission interface. The display processing circuit 110 may provide pixel data of the second corrected image frame to the projection module 120 according to a data transmission interface standard of the data transmission interface, and the projection module 120 may project a rectangular projection image subjected to the keystone correction processing. For example, the data transmission interface may be used to transmit the second corrected image frame conformed to a pRGB specification, an sRGB specification, a BT601 specification, and a BT656 specification.

Implementation details of the keystone correction function implemented by the display processing circuit 110 are described in detail below.

Figure 3:
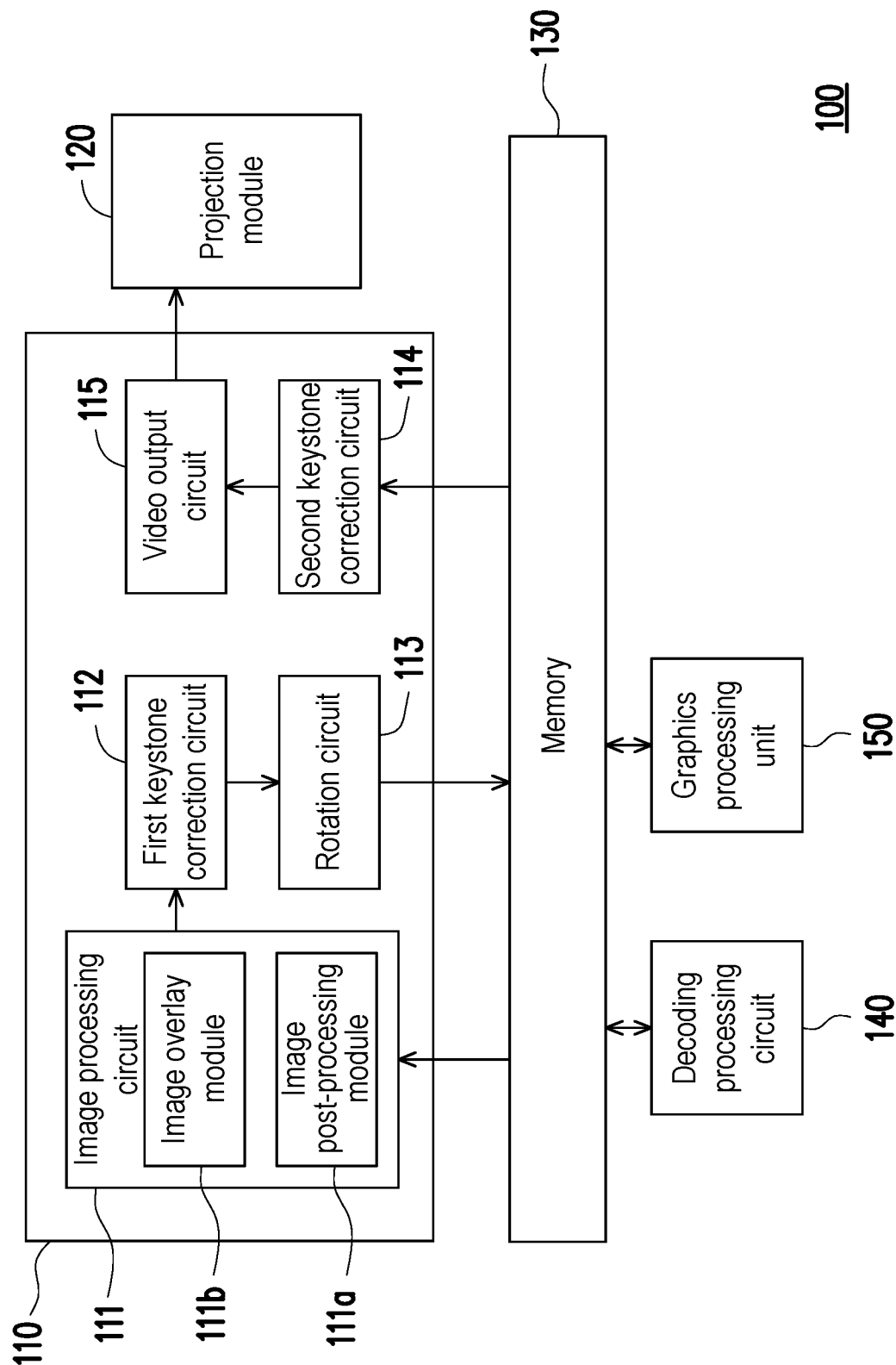
FIG. 3 is a schematic view of a projection apparatus according to an embodiment of the disclosure.

Referring to FIG. 3, FIG. 3 is a schematic view of a projection apparatus according to an embodiment of the disclosure. In addition to the display processing circuit 110, the projection module 120, and the memory 130, the projection apparatus 110 may further include a decoding processing circuit 140 and a graphics processing unit 150. The decoding processing circuit 140 and the graphics processing unit 150 are both coupled to the memory 130 through the memory bus.

The decoding processing circuit 140 performs a decoding operation to generate an original image frame, and the decoding processing circuit 140 writes the original image frame into the memory 130. The decoding processing circuit 140 may apply an HEVC standard, an AVS2 standard or other similar video coding and decoding standards, which is not limited by the disclosure. In some embodiments, the decoding processing circuit 140 may receive a bit stream generated through encoding and compression processing, and decode the bit stream according to the aforementioned video compression standard to reconstruct the image frame data in the received bit stream. In other words, the decoding processing circuit 140 may reconstruct an original image frame of a video, so that the projection apparatus 100 may project the video content.

The graphics processing unit 150 may be implemented by a GPU, which writes graphics data into the memory 130. In some embodiments, the graphics processing unit 150 may generate graphics data according to actual needs, such as an OSD menu of the projection apparatus 100, other user operation menus, or other image data that may be superimposed on the projection image, etc.

The display processing circuit 110 includes an image processing circuit 111, a first keystone correction circuit 112, a rotation circuit 113, a second keystone correction circuit 114, and a video output circuit 115.

In this embodiment, the image processing circuit 111 reads the original image frame generated by the decoding processing circuit 140 and/or the graphics data generated by the graphics processing unit 150 from the memory 130. The image processing circuit 111 performs image post-processing and image overlay processing on the original image frame and the graphics data, so as to generate a processed image frame. To be specific, the image processing circuit 111 may include an image post-processing module 111a and an image overlay module 111b. The image post-processing module 111a may obtain the original image frame generated by the decoding processing circuit 140 and/or the graphics data generated by the graphics processing unit 150 from the memory 130 and performs image post-processing accordingly. The aforementioned image post-processing is, for example, image scaling processing, image denoising processing, image enhancement processing, image tone processing or image overlay processing, etc. Then, the image overlay module 111b may perform image overlay processing on the original image frame and/or the graphics data subjected to the image post-processing, so as to generate a processed image frame.

The image processing circuit 111 supplies the processed image frame to the first keystone correction circuit 112. The first keystone correction circuit 112 performs the first keystone correction processing on the processed image frame based on the horizontal scaling processing, so as to obtain the first corrected image frame. The first keystone correction processing includes at least one nonlinear interpolation filtering and one linear scaling filtering of the horizontal direction. In some embodiments, the first corrected image frame may include image frame data of the trapezoidal image block and the background block generated based on the horizontal scaling processing. Alternatively, in some embodiments, the first corrected image frame may include image frame data generated after nonlinear interpolation filtering is performed on the image frame data having the trapezoidal image block and the background block.

Namely, in some embodiments, the first keystone correction processing may include nonlinear interpolation filtering of a vertical direction, linear scaling filtering of the horizontal direction, and nonlinear interpolation filtering of the horizontal direction. In detail, in order to avoid distortion or deformation of the projection image generated after the keystone correction, the keystone correction circuits (i.e., the first keystone correction circuit 112 and the second keystone correction circuit 114) in the display processing circuit 110 perform the horizontal scaling processing based on a principle of nonlinear line taking. Namely, in the process of horizontal scaling processing, the keystone correction circuits extract input pixels in the input image frame to generate output pixels according to a nonlinear correspondence rule. For example, a $k^{th}$ row of the output pixels generated by the horizontal scaling processing is generated based on a $p^{th}$ row of the input pixels (or the $p^{th}$ row of the input pixels and a $(p+1)^{th}$ row of the input pixels), where k may not be equal to p. In the case of performing the horizontal scaling processing based on the principle of nonlinear line taking, since the display processing circuit 110 needs to perform the linear scaling filtering of the horizontal direction twice, the display processing circuit 110 also needs to perform the nonlinear interpolation filtering twice. In this way, before the linear scaling filtering of the horizontal direction, image frame data suitable for being input to a linear scaling filter may be generated according to the nonlinear correspondence rule.

In some embodiments, the first keystone correction circuit 112 may convert the processed image frame into a trapezoidal image block through nonlinear interpolation filtering of the vertical direction and linear scaling filtering of the horizontal direction. Then, the first keystone correction circuit 112 may perform nonlinear interpolation filtering of the horizontal direction on the image frame data including the aforementioned trapezoidal image block and background block to generate a first corrected image frame. In other words, in some embodiments, the first keystone correction circuit 112 may be in charge of performing the nonlinear interpolation filtering of the horizontal direction and the vertical direction, so that the subsequent second keystone correction circuit 114 may avoid performing the nonlinear interpolation filtering of the vertical direction, so as to improve access efficiency of an internal memory (not shown) of the second keystone correction circuit 114.

The rotation circuit 113 performs rotation processing on the first corrected image frame output by the first keystone correction circuit 112 and writes the rotated image frame into the memory 130. As mentioned above, the rotation circuit 113 may write the pixels of the first corrected image frame back to the memory 130 through the memory bus according to a certain order and storage location, so as to perform rotation processing or mirroring processing on the first corrected image frame. It should be noted that the rotation circuit 113 may determine a rotation angle of the rotation processing according to a projection mode of the projection apparatus 100. The rotation angle is, for example, 90 degrees, 180 degrees, or 270 degrees. The projection mode includes a normal projection mode, a portrait projection mode, a flip projection mode, and a rear projection mode. It is known that the display processing circuit 110 may complete the projection rotation processing or projection mirroring processing based on the projection mode in the process of executing the keystone correction processing.

In detail, when the projection apparatus 110 is operated in the normal projection mode (which is also referred to as a horizontal projection mode), the flip projection mode or the rear projection mode, the decoding processing circuit 140 performs rotation processing on the original image frame and writes the rotated original image frame into the memory 130, and the graphics processing unit 150 performs rotation processing on the graphics data and writes the rotated graphics data into the memory 130.

More specifically, when the projection apparatus 110 is operated in the normal projection mode, the decoding processing circuit 140 and the graphics processing unit 150 may respectively perform rotation processing of 90 degrees clockwise on the original image frame and the graphics data. Correspondingly, the rotation circuit 113 subsequently performs rotation processing of 90 degrees anticlockwise. When the projection apparatus 110 is operated in the portrait projection mode, the decoding processing circuit 140 and the graphics processing unit 150 do not need to perform rotation processing on the original image frame and the graphics data. When the projection apparatus 110 is operated in the flip projection mode, the decoding processing circuit 140 and the graphics processing unit 150 may respectively perform rotation processing of 270 degrees clockwise on the original image frame and the graphics data. Correspondingly, the rotation circuit 113 subsequently performs rotation processing of 90 degrees clockwise. When the projection apparatus 110 is operated in the rear projection mode, the rotation circuit 113 may perform mirroring processing on the rotated image frame.

After the rotation circuit 113 writes the rotated image frame into the memory 130, the second keystone correction circuit 114 reads the rotated image frame from the memory 130. In addition, the second keystone correction circuit 114 performs second keystone correction processing on the rotated image frame based on the horizontal scaling processing to obtain a second corrected image frame. In some embodiments, if the first keystone correction circuit 112 is in charge of performing nonlinear interpolation filtering of the horizontal direction and nonlinear interpolation filtering of the vertical direction, the second keystone correction processing may include linear scaling filtering of the horizontal direction, and the second keystone correction circuit 114 does not need to perform nonlinear interpolation filtering related to a nonlinear curve. In other words, a memory demanding capacity of the second keystone correction circuit 114 may be less than a memory demanding capacity of the first keystone correction circuit 112. In addition, compared to that the second keystone correction circuit 114 performs the nonlinear interpolation filtering of the vertical direction, by performing the nonlinear interpolation filtering of the horizontal direction by the first trapezoidal correction circuit 112 in advance before the rotation operation, the processing efficiency may be significantly improved. A reason thereof is that the memory demanding capacity and efficiency required by filtering processing of the vertical direction are greater than the memory demanding capacity and efficiency required by filtering processing of the horizontal direction.

Finally, the video output circuit 115 may transmit the second corrected image frame output by the second keystone correction circuit 114 to the projection module 120 through the data transmission interface.

Figure 4:
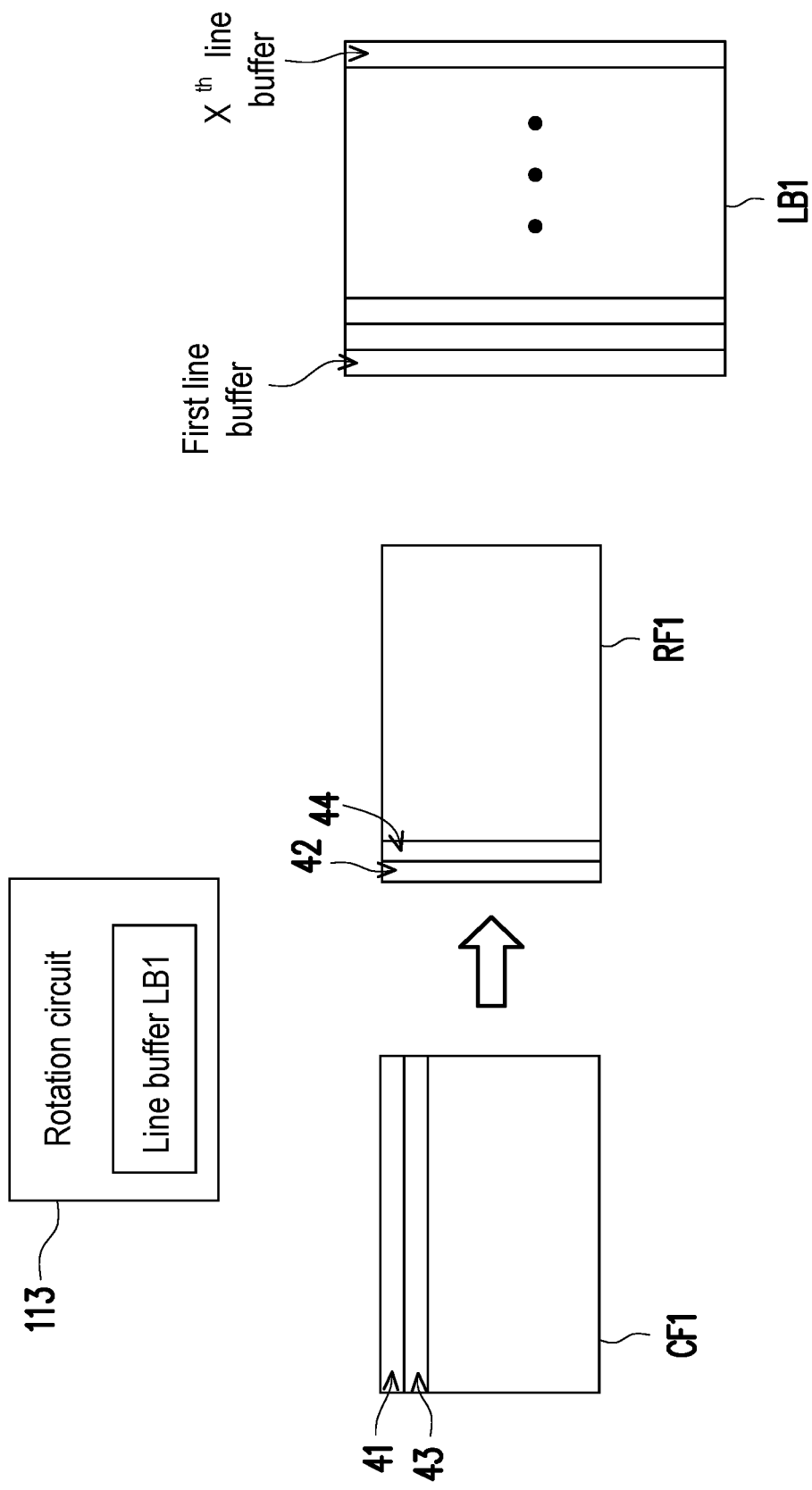
FIG. 4 is a schematic view illustrating a rotation circuit and a rotation operation performed by the same according to an embodiment of the disclosure.

FIG. 4 is a schematic view illustrating a rotation circuit and a rotation operation performed by the same according to an embodiment of the disclosure. Referring to FIG. 4, the rotation circuit 113 may include a line buffer LB1. The rotation circuit 113 may generate a plurality of columns of pixels of the rotated image frame according to a plurality of rows of pixels of the first corrected image frame CF1, and the line buffer LB1 records the plurality of columns of pixels of the rotated image frame. As shown in FIG. 4, the rotation circuit 113 may generate a first column of pixels 42 of the rotated image frame RF1 according to a first row of pixels 41 of the first corrected image frame CF1, and the rotation circuit 113 may generate a second column of pixels 44 of the rotated image frame RF1 according to a second row of pixels 43 of the first corrected image frame CF1, and so on. The line buffer LB1 is used to record a plurality of columns of pixels of the rotated image frame CF1. For example, a first line buffer is used to record the first column of pixels 42 of the rotated image frame RF1. Thereafter, the rotation circuit 113 may write multiple pixels corresponding to a same row position and different column positions in the line buffer LB1 into the memory 130 through a write request.

It should be noted that in some embodiments, a capacity of the line buffer LB1 may be determined according to a bit width of the memory bus. The rotation circuit 113 may write multiple pixels in the line buffer LB1 into the memory 130 through the memory bus, and the rotation circuit 113 may write multiple pixels in the same row position in the rotated image frame RF1 into the memory 130 through a write request. For example, it is assumed that based on the limitation of the bit width of the memory bus (assumed to be equal to 128 bits), the rotation circuit 113 may write pixel data of 128 bits into the memory 130 according to a single write request. If one pixel has 8 bits, it represents that one write request may write pixel data of 16 pixels into the memory 130. In this case, the line buffer LB1 may be configured as 16 line buffers for recording 16 columns of pixels of the rotated image frame RF1, and each line buffer is used to record a part of or all of pixels in one column of the rotated image frame RF1.

In some embodiments, the rotation circuit 113 may write the pixels in the line buffer LB1 into the memory 130 according to a line write format. For example, the rotation circuit 113 may simultaneously write pixels recorded in a plurality of line buffers into the memory 130 according to a write request, where the pixels of the same write request may be a plurality of pixels located in the same row of the rotated image frame RF1.

Moreover, when the line buffer LB1 is arranged, in some embodiments, the rotation circuit 113 may write the pixels in the line buffer LB1 into the memory 130 according to a tile write format. For example, the rotation circuit 113 may simultaneously write the pixels recorded in multiple line buffers into the memory 130 according to a write request based on the tile write format, where the pixels of the same write request may be a plurality of pixels in different row positions of the rotated image frame RF1. It is only required that a burst length of write request is greater than 1. For example, the rotation circuit 113 may first write a plurality of pixels located in the first row and located in the first column to the $16^{th}$ column in the rotated image frame RF1 into a tile of the memory 130 (a write address is marked as A) according to a write request, if the burst length of the write request is 2, a plurality of pixels located in the second row and located in the first column to the $16^{th}$ column in the rotated image frame may be subsequently written into the same tile of the memory 130 (and the write address closely follows A). Similarly, if the burst length of the write request is 3, a plurality of pixels located in the third row and located in the first column to the $16^{th}$ column in the rotated image frame may be subsequently written into the same tile of the memory 130. Therefore, when the burst length of a write request may be flexibly configured to be greater than 1, the rotating circuit 113 may use a fewer number of times of requests and more data bursts corresponding to a single write request to write the rotated image frame RF1 into the memory 130. In this way, the access efficiency of the rotating circuit 113 to the memory 130 may be significantly improved, and address continuity efficiency is also enhanced.

It should be noted that in different embodiments, the aforementioned related functions of the display processing circuit 110 may be implemented as software, firmware or hardware by using general programming languages (such as C or C++), hardware description languages (such as Verilog HDL or VHDL), or other suitable programming languages. The software (or firmware) that may perform the related functions may be arranged as any known computer-accessible media, such as magnetic tapes, semiconductor memories, magnetic disks or compact disks (such as CD-ROM or DVD-ROM). The software (or firmware) may be stored in an accessible medium (such as a memory) of a computer, so that a processor of the computer may access/execute programming codes of the software (or firmware) to implement the related functions.

In summary, in the embodiments of the disclosure, the projection apparatus may implement the keystone correction function by performing highly efficient horizontal scaling processing, so that a viewer may view a rectangular and undistorted projection image from the projection surface. In addition, during the process that the display processing circuit accesses the memory, wasting of the access bandwidth is prevented from occurring, so that bandwidth consumption of accessing the memory may be greatly saved. Moreover, the display processing circuit may complete the keystone correction and the projection direction conversion related to the projection mode at the same time, which improves the processing efficiency. Therefore, the projection quality may be improved along with accomplishment of highly efficient and low-cost keystone correction.

It will be apparent to those skilled in the art that various modifications and variations can be made to the structure of the disclosure without departing from the scope or spirit of the disclosure. In view of the foregoing, it is intended that the disclosure cover modifications and variations of this disclosure provided they fall within the scope of the following claims and their equivalents.

What is claimed is:
1. A projection apparatus, comprising:
a projection module;
a memory; and a display processing circuit, coupled to the projection module, coupled to the memory through a memory bus, wherein the display processing circuit comprises:
  an image processing circuit, generating a processed image frame;
  a first keystone correction circuit, performing first keystone correction processing on the processed image frame based on horizontal scaling processing to obtain a first corrected image frame;
  a rotation circuit, performing rotation processing on the first corrected image frame to write a rotated image frame into the memory;
  a second keystone correction circuit, reading the rotated image frame from the memory, performing second keystone correction processing on the rotated image frame based on the horizontal scaling processing to obtain a second corrected image frame; and
  a video output circuit, transmitting the second corrected image frame to the projection module through a data transmission interface.

2. The projection apparatus according to claim 1, wherein the first keystone correction processing comprises non-linear interpolation filtering of a vertical direction, linear scaling filtering of a horizontal direction, and non-linear interpolation filtering of the horizontal direction.

3. The projection apparatus according to claim 2, wherein the second keystone correction processing comprises the linear scaling filtering of the horizontal direction.

4. The projection apparatus according to claim 1, wherein the rotation circuit comprises a line buffer, the rotation circuit generates a plurality of columns of pixels of the rotated image frame according to a plurality of rows of pixels of the first corrected image frame, and the line buffer records the plurality of columns of pixels of the rotated image frame.

5. The projection apparatus according to claim 4, wherein a capacity of the line buffer is determined according to a bit width of the memory bus, the rotation circuit writes a plurality of pixels in the line buffer into the memory, and the rotation circuit writes a plurality of pixels located in a same row position in the rotated image frame into the memory through a write request.

6. The projection apparatus according to claim 5, wherein the rotation circuit writes the pixels in the line buffer into the memory according to a tile write format.

7. The projection apparatus according to claim 1, wherein the image processing circuit reads an original image frame and graphics data from the memory and performs image post-processing and image overlay processing on the original image frame and the graphics data to generate the processed image frame.

8. The projection apparatus according to claim 1, further comprising a decoding processing circuit and a graphics processing unit, wherein the decoding processing circuit and the graphics processing unit are both coupled to the memory through the memory bus, the decoding processing circuit performs a decoding operation to generate an original image frame, the decoding processing circuit writes the original image frame into the memory, and the graphics processing unit writes graphics data into the memory.

9. The projection apparatus according to claim 1, wherein the rotation circuit determines a rotation angle of the rotation processing according to a projection mode of the projection apparatus, the projection mode comprises a normal projection mode, a portrait projection mode, a flip projection mode, and a rear projection mode.

10. A keystone correction method, adapted to a projection apparatus comprising a projection module, a memory, and a display processing circuit, wherein the keystone correction method comprises:
  generating a processed image frame by the display processing circuit;
  performing first keystone correction processing on the processed image frame by the display processing circuit based on horizontal scaling processing to obtain a first corrected image frame;
  performing rotation processing on the first corrected image frame by the display processing circuit to write a rotated image frame into the memory;
  reading the rotated image frame from the memory by the display processing circuit and performing second keystone correction processing on the rotated image frame based on the horizontal scaling processing to obtain a second corrected image frame; and
  transmitting the second corrected image frame to the projection module by the display processing circuit through a data transmission interface,
  wherein the first keystone correction processing comprises non-linear interpolation filtering of a vertical direction, linear scaling filtering of a horizontal direction, and non-linear interpolation filtering of the horizontal direction.

* * * * *